Sept. 2, 1941.  G. E. NERNEY  2,254,749
EYEGLASS CONSTRUCTION
Filed April 15, 1939
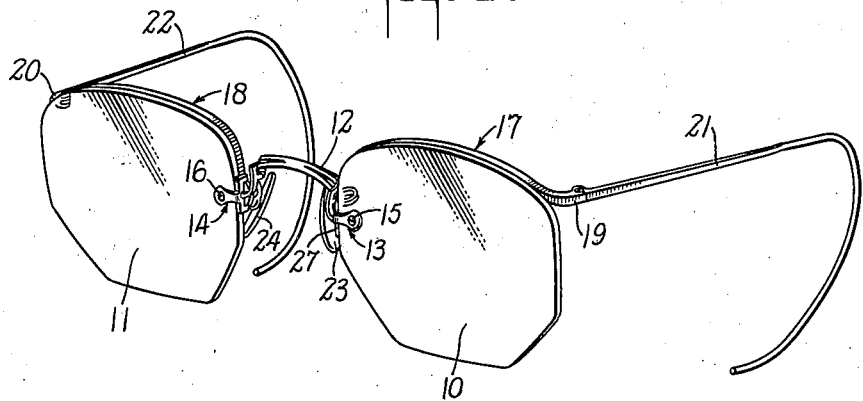
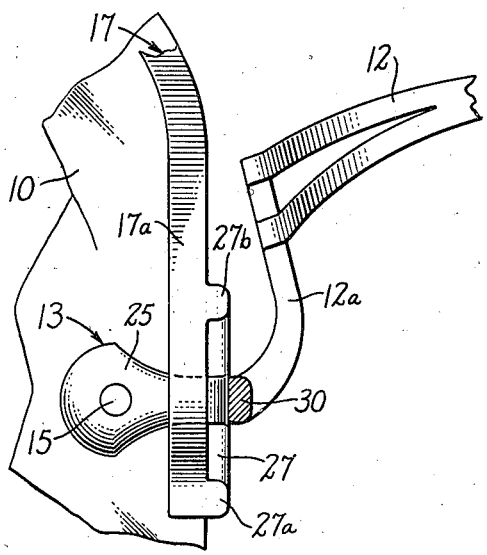
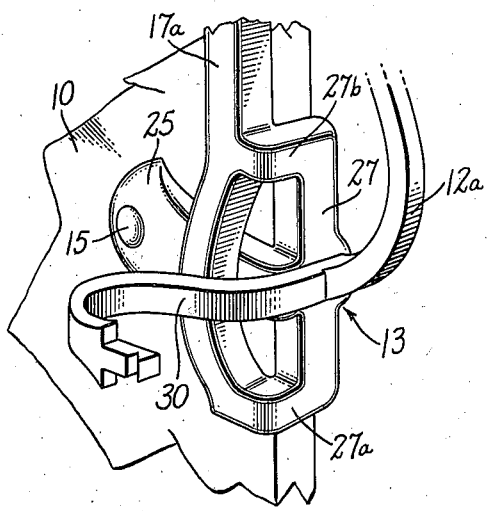
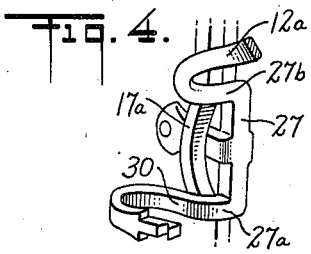
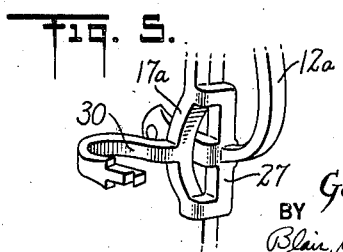
INVENTOR
George E. Nerney
BY
Blair, Curtis, Dunne + Hayward
ATTORNEYS Patented Sept. 2, 1941

2,254,749

UNITED STATES PATENT OFFICE 2,254,749

EYEGLASS CONSTRUCTION

George E. Nerney, Attleboro, Mass., assignor to Bay State Optical Company, Attleboro, Mass., a corporation of Maine Application April 15, 1939, Serial No. 267,977

7 Claims. (Cl. 88—41)

This invention relates to an eyeglass construction and more particularly to the supporting structure for lenses or the like.

One of the objects of this invention is to provide an eyeglass construction which is simple, practical and thoroughly durable. Another object is to provide a construction of the above character which may be economically manufactured from inexpensive materials. Another object is to provide a construction of the above character which will be particularly sturdy and well able to withstand hard usage. Another object is to provide a construction of the above character which is neat and attractive in appearance. Another object is to provide a construction of the above character wherein the lenses are particularly safeguarded against breakage. Other objects will be in part obvious and in part pointed out hereinafter.

The invention accordingly consists in the features of construction, combinations of elements and arrangements of parts as will be exemplified in the structure to be hereinafter described and the scope of the application of which will be indicated in the following claims.

In the accompanying drawing in which is shown several of the various possible embodiments of my invention, Figure 1 is a perspective view of a pair of spectacles having my invention embodied therein;

Figure 2 is an enlarged fragmentary elevation, partially in section, of certain of the parts shown in Figure 1;

Figure 3 is an enlarged fragmentary perspective view of my lens supporting structure;

Figure 4 is a fragmentary perspective view of a modified form of my lens supporting structure; and, Figure 5 is a fragmentary perspective view of another modification of my lens supporting structure.

Similar reference characters refer to similar parts throughout the several views of the drawing.

As conducive to a clearer understanding of certain features of this invention, it might here be pointed out that spectacles of the rimless type are now being produced with the supporting structure for the lenses located at one point thereon. In such spectacles there is a great deal of strain placed on this one point connection often resulting in breakage. Where this connecting point is located adjacent the bridge and a supporting member for the end piece is connected thereto and extends outwardly therefrom to the end piece position, there is considerable leverage in this supporting member and, in normal use, when the temple is grasped, the resulting leverage tends to pull the supporting member away from its point of attachment. Other factors make this type of spectacle frame as now produced a particularly fragile article. One of the objects of this invention is to provide a construction in which the several difficulties mentioned above are successfully and practically overcome.

Referring now to Figure 1, there is shown a pair of spectacles having lenses 10 and 11 connected by a bridge 12. More specifically, saddle members generally indicated at 13 and 14 are secured to lenses 10 and 11 by way of screws 15 and 16. The leg portions of bridge 12 are secured to the portions of saddles 13 and 14 adjacent the edges of the lens as will be more fully pointed out hereinafter.

A pair of supporting members generally indicated at 17 and 18 are also connected to saddles 13 and 14 and extend outwardly therefrom to terminate in end piece portions 19 and 20. Temples 21 and 22 are secured to end pieces 19 and 20 in the usual manner.

Preferably supporting members 17 and 18 follow the edge contours of lenses 10 and 11 and lie adjacent the rear planar surfaces of the lenses. Thus, they extend upwardly and outwardly from their connecting points with saddles 13 and 14 and finally curve downwardly and rearwardly to terminate in end-pieces 19 and 20. Accordingly, end pieces 19 and 20 are located on the opposite sides of lenses 10 and 11 from saddles 13 and 14. The position of end pieces 19 and 20 may be expressed as the opposite side of the centers of lenses 10 and 11 from saddles 13 and 14. Thus, the entire spectacle frame is supported at its outer ends by the temples 21 and 22, this supporting force being transferred to the saddles 13 and 14 by way of supporting members 17 and 18. Bridge 12 and nose pads 23 and 24 support the major portion of the weight of the frame but all additional support is accomplished by way of temples 21 and 22 as described above. This places a particular strain on the connection between supporting members 17 and 18 and saddles 13 and 14.

In Figures 2 and 3 there is shown an enlarged view of saddle 13 with adjacent parts. Preferably the structure is identical for both the lenses 10 and 11 and consequently these details will only be described in connection with saddle 13. Saddle 13 comprises a pair of arms, such as arm 25 (Figure 2) embracing the opposite planar surfaces of lens 10 and secured thereto as described above by screw 15. Arm 25 is adjacent the rear surface of lens 10 as this lens is viewed in Figure 1.

Arms 25 of saddle 13 are connected at the edge portion of the lens by way of a strap 27 (Figures 2 and 3) which engages the edge of the lens and extends above and below arms 25. Bridge 12 has a leg 12a (Figure 2) which extends downwardly and is secured to strap 27 preferably near the central portion thereof (see Figure 3). Strap 27 is provided with a pair of legs 27a and 27b at the opposite ends thereof, which extend outwardly from the rear planar surface of lens 10 and substantially at right angles to the plane of the lens.

Supporting member 17 (Figure 2) curves downwardly and terminates in a substantially vertical portion 17a, the lower end of which is secured in any suitable manner to legs 27a and 27b. Thus, as best shown in Figure 2, the surfaces of legs 27a and 27b adjacent the edge of the lens are substantially flat and may thus be secured to portions 17a of the supporting member by soldering or welding.

As it is desirable that strap 27 have a relative capacity for freedom of movement for purposes of adjustment so as to enable the fitter to conform the strap to the lens, portion 17a of supporting member 17 is preferably attached only to legs 27a and 27b, i. e. portion 17a is bent adjacent its extremity so as to curve over and clear arm 25. By this arrangement it will appear that substantial flexibility of adjustment, such as is necessry for correctly determining the proper elevation of the lens, is afforded without sacrificing structural strength. Accordingly, supporting member 17 is so efficiently secured to saddle 13 that, regardless of various strains placed on this connection by the leverage action of temple 21 and supporting member 17 acting as a unit, the parts will not become distorted or displaced. Furthermore, as supporting member 17 is located on the rear surface of the lens, the points of connection are also on the rear side of the frame as viewed in Figure 1, thus eliminating this desirable but nevertheless slightly bulky structure from normal view.

With reference to Figure 3, it will be seen that arm 12a of bridge 12 is connected to strap 27 substantially centrally thereof, and if desired a nose pad supporting arm 30 may also be connected to the strap at this point. Thus, in effect, nose pad arm 30 is a continuation of bridge 12 and accordingly these two parts could be made from the same piece of eye wire, if desired. This feature affords not only a greatly simplified structure with resulting saving in expense, but also affords additional sturdiness to the bridge and nose pad assembly.

In Figure 4, I have shown bridge arm 12a as a continuation of strap leg 27b and nose pad supporting arm 30 as a continuation of strap leg 27a, while in Figure 5, nose pad arm 30 is shown connected directly to the curved end portion 17a of supporting member 17, substantially centrally thereof. These modifications illustrate a highly desirable practical feature, as it enables the fitter to attach the nose pad arm and bridge over a considerable range of soldering positions, thus enabling him to accommodate the spectacles to a considerable variety of circumstances.

With respect to Figure 4, it will be clear that the bridge arm 12a, strap 27 and its legs 27a and 27b, together with nose pad arm 30, may be integral, i. e. formed from one piece of eye wire.

It will thus be seen that I have provided a thoroughly practical and efficient structure in which the several objects hereinabove mentioned are successfully and efficiently carried out.

As many possible embodiments may be made of the above invention and as many changes might be made in the embodiment above set forth, it is to be understood that all matter hereinbefore set forth or shown in the accompanying drawing, is to be interpreted as illustrative and not in a limiting sense.

I claim:

1. In eyeglass construction, in combination, a lens, a saddle member connected to said lens, parts of said saddle extending both upwardly and downwardly along the edge of said lens, a pair of legs extending rearwardly from the upper and lower end of said parts respectively, and a temple-supporting member extending along the rear surface of the upper edge of said lens and connected to the rear ends of said legs, whereby the lower end of said temple-supporting member bridges the parts of said saddle connecting said saddle to said lens.

2. In eyeglass frame construction, in combination, a pair of lenses, a pair of members connected to the inner edges of said lenses, a bridge connecting said members, parts connected to said members extending upwardly and downwardly therefrom, legs attached to said upwardly and downwardly extending parts, said legs extending rearwardly from said parts and connected to said parts at points spaced upwardly and downwardly from the connection of said members to said lens, and a pair of temple-supporting members secured to the rear ends of said legs, said temple-supporting members extending outwardly along the rear planar surfaces of said lenses at the upper edges thereof, the connections between said temple-supporting members and said legs being the sole connection of said temple-supporting members to said frame.

3. In eyeglass construction, in combination, a lens, a saddle member connected to said lens, parts of said saddle extending both upwardly and downwardly along the edge of said lens, a pair of legs extending rearwardly from the upper and lower ends of said parts respectively, a bridge member, one end of said bridge member being connected to the outer end of the upper leg, a nose pad arm, said nose pad arm being connected to the outer end of said lower leg, and a temple-supporting member extending along the rear planar surface of said lens at the upper edge thereof, said temple-supporting member being connected to the rear ends of said legs adjacent the points of attachment of said bridge member and said nose pad arm.

4. In eyeglass frame construction, in combination, a pair of lenses, a pair of saddle members connected to the inner edges of said lenses, said saddle members including parts extending upwardly and downwardly along said lens edges, legs attached to said upwardly and downwardly extending parts adjacent the ends thereof, said legs extending rearwardly from said parts and connected to said parts at points spaced upwardly and downwardly from the points of connection of said saddles to said lenses, and a pair of temple supporting members secured to the rear ends of said legs, said temple supporting members etxending outwardly along the rear planar surfaces of said lenses at the upper edges thereof, whereby the lower ends of said temple supporting members bridge the parts of said saddles connecting said saddles to said lenses.

5. In eyeglass frame construction, in combination, a pair of lenses, a pair of saddle members connected to the inner edges of said lenses, a bridge member connecting said saddle members, the point of connection between said bridge member and said saddle members being positioned on said saddle members adjacent the inner ends of the arms thereof, parts connected to said saddle members extending upwardly and downwardly therefrom, legs attached to said upwardly and downwardly extending parts, said legs extending rearwardly from said parts and connected to said parts at points spaced upwardly and downwardly from the connection of said members to said lenses, and a pair of temple supporting members secured to the rear ends of said legs, said temple supporting members extending outwardly along the rear surfaces of said lenses at the upper edges thereof, the connection between said temple supporting members and said legs being the sole connection of said temple supporting members to said frame.

6. In eyeglass frame construction, in combination, a pair of lenses, a pair of saddle members connected to the inner edges of said lenses, a bridge member connecting said saddle members, a pair of nose pad arms, the point of connection of said nose pad arms, said bridge members, and said saddle members being positioned on said saddle member adjacent the inner ends of the arms thereof, parts connected to said saddle members extending upwardly and downwardly therefrom, legs attached to said upwardly and downwardly extending parts, said legs extending rearwardly from said parts and connected to said parts at points spaced upwardly and downwardly from the connection of said members to said lenses, and a pair of temple supporting members secured to the rear ends of said legs, said temple supporting members extending outwardly along the rear surfaces of said lenses at the upper edges thereof, the connection between said temple supporting members and said legs being the sole connection of said temple supporting members to said frame.

7. In eyeglass construction, in combination, a lens, a saddle member connected to said lens, parts of said saddle member extending both upwardly and downwardly along the edge of said lens, a pair of legs extending rearwardly from the upwardly and downwardly extending parts of said saddle, the points of connection of said legs and said parts being at points spaced upwardly and downwardly from the point of connection of said saddle to said lens, a temple supporting member extending along the rear surface of the upper edge of said lens and connected to the rear ends of said legs, whereby the lower end of said temple supporting member bridges the parts of said saddle connecting said saddle to said lens, a bridge member, and a nose pad arm connected to said temple supporting member at a point positioned thereon between the rear ends of said legs.

GEORGE E. NERNEY.